(12) United States Patent
Minamide (10) Patent No.: US 10,708,455 B2
(45) Date of Patent: Jul. 7, 2020

(54) OPERATION INPUT DEVICE CAPABLE OF NOTIFYING OPERATION ICON BY VOICE, IMAGE PROCESSING APPARATUS, NOTIFYING METHOD, PROCESS EXECUTING METHOD

(71) Applicant: KYOCERA Document Solutions Inc., Osaka-shi, Osaka (JP)

(72) Inventor: Hayato Minamide, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 16/273,799

(22) Filed: Feb. 12, 2019

(65) Prior Publication Data

US 2019/0260881 A1 Aug. 22, 2019

(30) Foreign Application Priority Data

Feb. 19, 2018 (JP) .................................. 2018-026856

(51) Int. Cl.
*H04N 1/00* (2006.01)

(52) U.S. Cl.
CPC ....... *H04N 1/0048* (2013.01); *H04N 1/00403* (2013.01); *H04N 1/00411* (2013.01); *H04N 1/00424* (2013.01); *H04N 1/00488* (2013.01); *H04N 1/00384* (2013.01); *H04N 1/00925* (2013.01)

(58) Field of Classification Search
None
See application file for complete search history.

(56) References Cited

U.S. PATENT DOCUMENTS

| 2012/0029200 A1 | 2/2012 | Olson et al. |
| 2013/0031516 A1* | 1/2013 | Sawayanagi ....... H04N 1/00411 715/863 |

FOREIGN PATENT DOCUMENTS

JP 201214648 A 1/2012

* cited by examiner

*Primary Examiner* — Benny Q Tieu
*Assistant Examiner* — Haris Sabah
(74) *Attorney, Agent, or Firm* — Alleman Hall Creasman & Tuttle LLP (57) ABSTRACT

An operation input device includes a display processing portion, a setting processing portion, and a notification processing portion. The display processing portion displays an operation icon made to correspond to a predetermined process on a display portion. The setting processing portion sets an operation restricting area in which a touch operation on the display portion is restricted. The notification processing portion notifies, by voice, the operation icon partially or completely overlapped with the operation restricting area set by the setting processing portion.

10 Claims, 5 Drawing Sheets

|  | ADDRESS INFORMATION | COORDINATE INFORMATION |
|---|---|---|
| OPERATION ICON T11 | 1011 | (20、20) |
| OPERATION ICON T12 | 1013 | (20、70) |
| OPERATION ICON T13 | 1014 | (130、70) |
| OPERATION ICON T14 | 1015 | (20、120) |
| OPERATION ICON T15 | 1016 | (130、120) |

|  | NOTIFICATION INFORMATION |
|---|---|
| OPERATION ICON T11 | COPY |
| OPERATION ICON T12 | COLOR/MONOCHROME |
| OPERATION ICON T13 | DENSITY |
| OPERATION ICON T14 | NUMBER OF PAGES |
| OPERATION ICON T15 | ENLARGE/REDUCE |
| ⋮ | ⋮ |

FIG.7

OPERATION INPUT DEVICE CAPABLE OF NOTIFYING OPERATION ICON BY VOICE, IMAGE PROCESSING APPARATUS, NOTIFYING METHOD, PROCESS EXECUTING METHOD

INCORPORATION BY REFERENCE

This application is based upon and claims the benefit of priority from the corresponding Japanese Patent Application No. 2018-026856 filed on Feb. 19, 2018, the entire contents of which are incorporated herein by reference.

BACKGROUND

The present disclosure relates to an operation input device, an image processing apparatus including the operation input device, a notifying method executed in the operation input device, and a process executing method.

In an image processing apparatus such as a multifunctional peripheral, a display portion such as a liquid crystal display, and an operation detecting portion such as a touch panel may be provided. In addition, in this type of image processing apparatus, an operation restricted area may be set, in which touch operations to the display portion are restricted.

SUMMARY

An operation input device according to an aspect of the present disclosure includes a display processing portion, a setting processing portion, and a notification processing portion. The display processing portion displays an operation icon that is made to correspond with a predetermined process, on a display portion. The setting processing portion sets an operation restricting area in which a touch operation on the display portion is restricted. The notification processing portion notifies, by voice, the operation icon partially or completely overlapped with the operation restricting area set by the setting processing portion.

An image processing apparatus according to another aspect of the present disclosure includes the operation input device, and either or both of an image reading portion configured to read image data of a document sheet, and an image forming portion configured to form an image based on image data.

A notifying method according to a further aspect of the present disclosure includes: displaying an operation icon corresponding to a predetermined process on a display portion; setting an operation restricting area in which a touch operation on the display portion is restricted; and notifying, by voice, the operation icon partially or completely overlapped with the operation restricting area that is set.

A process executing method according to still further aspect of the present disclosure, executed in an operation input device including a display portion, includes: displaying an operation icon corresponding to a predetermined process on the display portion; setting an operation restricting area in which a touch operation on the display portion is restricted; notifying, by voice, the operation icon partially or completely overlapped with the operation restricting area that is set; executing a process in response to a touch operation on the operation icon, the process corresponding to the operation icon on which the touch operation is performed; and executing a process in response to an identification operation, different from the touch operation on the display portion, that identifies the operation icon overlapped with the operation restricting area, the process corresponding to the operation icon identified by the identification operation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Schematic Configuration of Image Processing Apparatus 10]

Figure 1:
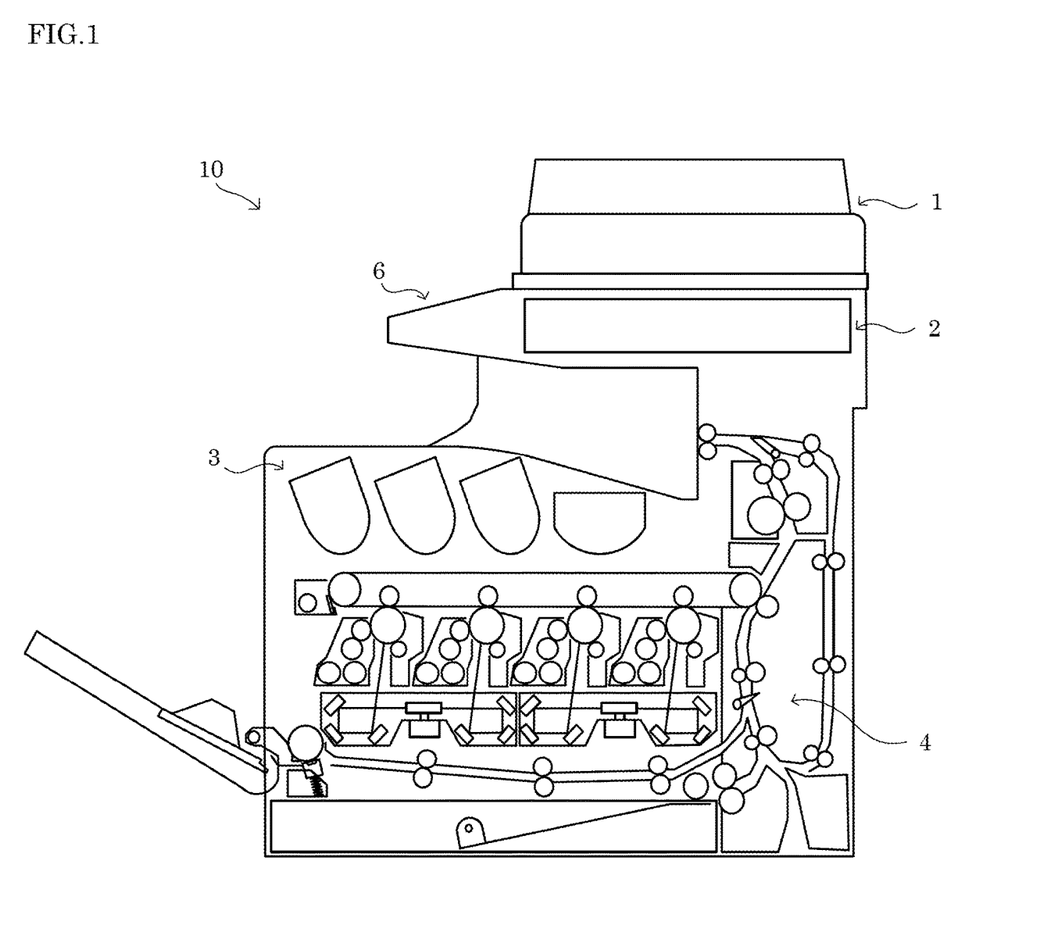
FIG. 1 is a diagram showing a configuration of an image processing apparatus according to an embodiment of the present disclosure.
Figure 2:
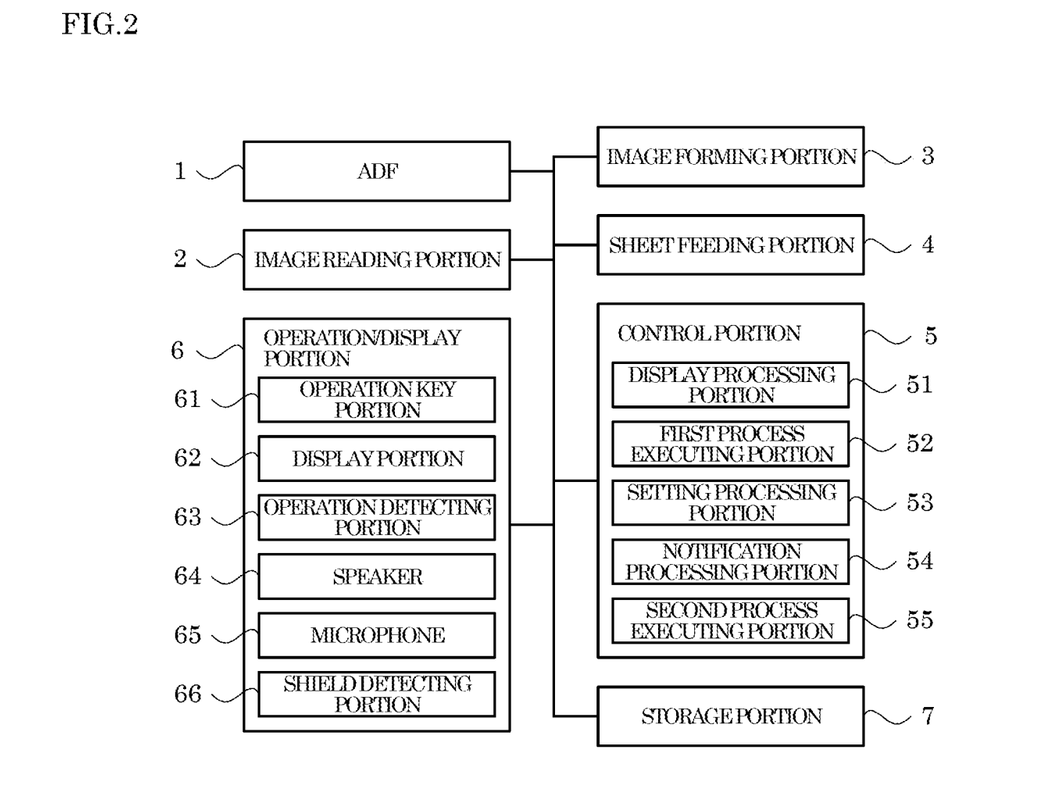
FIG. 2 is a block diagram showing a system configuration of the image processing apparatus according to the embodiment of the present disclosure.
Figure 3:
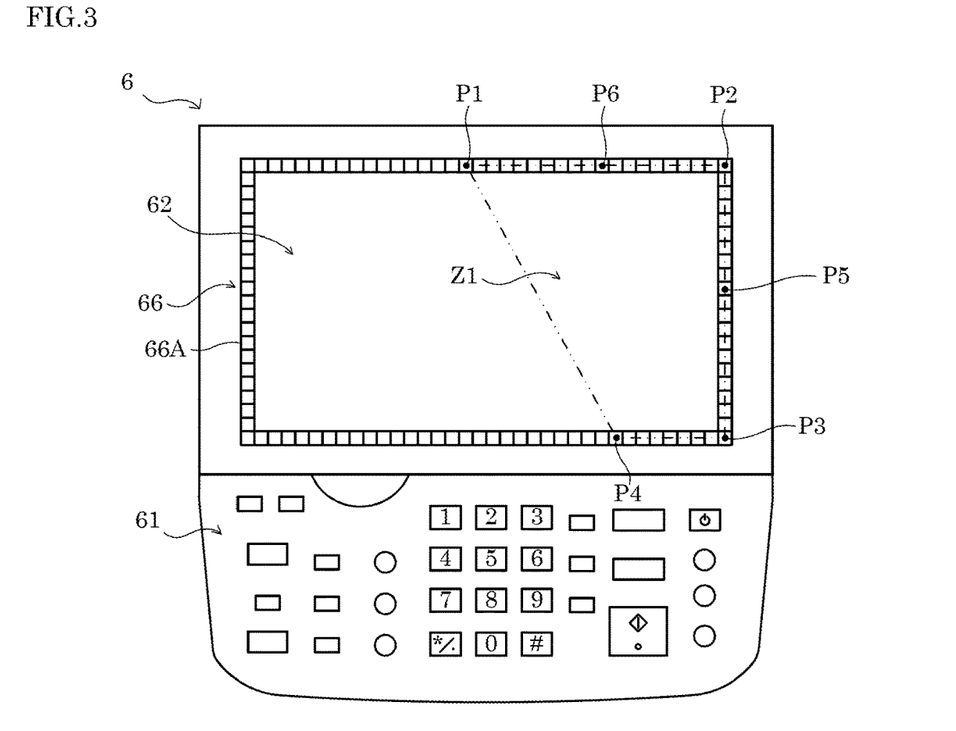
FIG. 3 is a diagram showing a configuration of an operation/display portion of the image processing apparatus according to the embodiment of the present disclosure.

First, with reference to FIG. 1 to FIG. 3, a description is given of a schematic configuration of an image processing apparatus 10 according to an embodiment of the present disclosure. Here, FIG. 1 is a schematic cross-sectional diagram showing the configuration of the image processing apparatus 10. In addition, FIG. 3 is a plan diagram showing a configuration of an operation/display portion 6. It is noted that a two-dot chain line in FIG. 3 indicates a shielded area Z1.

The image processing apparatus 10 is a multifunctional peripheral having a plurality of functions, such as a scanning function for reading image data from a document sheet, a printing function for forming an image based on image data, a facsimile function, and a copying function. It is noted that the image processing apparatus 10 may be a scanner apparatus, a printer apparatus, a facsimile apparatus, or a copier.

As shown in FIG. 1 and FIG. 2, the image processing apparatus 10 includes an ADF (Automatic Document Feeder) 1, an image reading portion 2, an image forming portion 3, a sheet feeding portion 4, a control portion 5, the operation/display portion 6, and a storage portion 7.

The ADF 1 conveys a document sheet to be read by the image reading portion 2. Specifically, the ADF 1 includes a document sheet setting portion, a plurality of conveyance rollers, a document sheet holder, and a sheet discharge portion.

The image reading portion 2 can read image data from the document sheet. Specifically, the image reading portion 2 includes a document sheet table, a light source, a plurality of mirrors, an optical lens, and a CCD.

The image forming portion 3 is configured to electrographically form a color or monochrome image based on the image data read by the image reading portion 2. In addition, the image forming portion 3 may be configured to form an image based on image data input from an information processing apparatus such as an external personal computer. Specifically, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, and a sheet discharge tray. It is noted that the image forming portion 3 may form an image by another image forming method, such as an ink jet method.

The sheet feeding portion 4 supplies a sheet to the image forming portion 3. Specifically, the sheet feeding portion 4 includes a sheet feeding cassette and a plurality of conveyance rollers. In the image processing apparatus 10, the color or monochrome image is formed on the sheet supplied from the sheet feeding portion 4, and the sheet on which the image has been formed is discharged to the sheet discharge tray.

The control portion 5 includes control devices such as a CPU, a ROM, a RAM, and an EEPROM, all of which are not shown. The CPU is a processor for executing various types of arithmetic processing. The ROM is a nonvolatile storage device in which information, such as a control program for the CPU to execute the various types of processing, is preliminarily stored. The RAM is a volatile storage device, and the EEPROM is a nonvolatile storage device. The RAM and the EEPROM are used as temporary storage memory (work area) for the various types of processing executed by the CPU. In the control portion 5, various types of control programs, preliminarily stored in the ROM, are executed by the CPU. This allows for the image processing apparatus 10 to be integrally controlled by the control portion 5. It is noted that the control portion 5 may be constituted by an electronic circuit such as an integrated circuit (ASIC), and may be provided separately from a main control portion that integrally controls the image processing apparatus 10.

The operation/display portion 6 is a user interface of the image processing apparatus 10. As shown in FIG. 2 and FIG. 3, the operation/display portion 6 includes an operation key portion 61, a display portion 62, an operation detecting portion 63, a speaker 64, a microphone 65, and a shield detecting portion 66.

The operation key portion 61 includes a plurality of hard keys for inputting various types of information to the control portion 5 in response to a user operation. For example, the operation key portion 61 may include a power key used for controlling power supply to the devices in the image processing apparatus 10, a start key used for commanding execution of various jobs, and a ten-key used for inputting numeric information (see FIG. 3).

The display portion 62 displays various types of information in response to a control command from the control portion 5. For example, the display portion 62 may be a liquid crystal display. For example, the display portion 62 may display a screen G10 (see FIG. 4) used for setting operations of a copy job executed in the image processing apparatus 10.

The operation detecting portion 63 is a touch panel configured to detect a user operation on the display portion 62. For example, when an object such as a user's finger comes in contact with the display portion 62, the operation detecting portion 63 detects a contact position (touch position) of the object in the display portion 62 by a resistive film system. It is noted that the operation detecting portion 63 may detect contact of the object with the display portion 62 using another detection system, such as an electrostatic capacitance system.

The speaker 64 is used for sounding an alarm, outputting voice data, or the like.

The microphone 65 is used for inputting a voice to the image processing apparatus 10.

The shield detecting portion 66 can detect a shielded area in the display portion 62 that is covered by a shielding object, such as the user's hand.

For example, as shown in FIG. 3, the shield detecting portion 66 is disposed adjacently to an edge portion of the display portion 62, and includes a plurality of sensors 66A provided side by side along the edge portion. For example, the sensors 66A are reflective optical sensors with light emitting portions and light receiving portions.

For example, when the light receiving portions of some of the sensors 66A receive light of a quantity exceeding a predetermined threshold, the shield detecting portion 66 detects the shielded area based on positions of the sensors 66A with the light receiving portions that have received light of a quantity exceeding the threshold.

For example, in FIG. 3, it is assumed that light of a quantity exceeding the threshold has been received by the light receiving portions of the sensors 66A disposed along straight lines connecting a position P1 and a position P2, a position P2 and a position P3, and a position P3 and a position P4. In this case, the shield detecting portion 66 detects a rectangular area surrounded by the straight lines connecting the position P1 and the position P2, the position P2 and the position P3, the position P3 and the position P4, and the position P4 and the position P1, as the shielded area Z1 (see FIG. 3). It is noted that the shield detecting portion 66 may detect a rectangular area whose corners include the position P1, the position P2, and the position P3 as the shielded area. In addition, the shield detecting portion 66 may detect a rectangular area whose corners include the position P2, the position P3, and the position P4 as the shielded area.

In addition, in FIG. 3, it is assumed that light of a quantity exceeding the threshold has been received by the light receiving portions of the sensors 66A disposed along straight lines connecting the position P1 and the position P2, and the position P2 and a position P5. In this case, the shield detecting portion 66 detects a triangular area surrounded by the straight lines connecting the position P1 and the position P2, the position P2 and the position P5, and the position P5 and the position P1, as the shielded area. It is noted that the shield detecting portion 66 may detect a rectangular area whose corners include the position P1, the position P2, and the position P5 as the shielded area.

In addition, in FIG. 3, it is assumed that light of a quantity exceeding the threshold has been received by the light receiving portions of the sensors 66A disposed along a straight line connecting the position P1 and a position P6. In this case, the shield detecting portion 66 detects, as the shielded area, a square area overlapped with a display area of the display portion 62, whose one side is the straight line connecting the position P1 and the position P6. It is noted that the shield detecting portion 66 may detect, as the shielded area, a rectangular area overlapped with the display area of the display portion 62, whose one side is the straight line connecting the position P1 and the position P6.

It is noted that the sensors 66A may be optical sensors having only light receiving portions. In addition, the sensors 66A may be pressure-sensitive sensors. In addition, the operation detecting portion 63 may also serve as the shield detecting portion 66. In addition, the shield detecting portion 66 may detect the shielded area by a method different from the methods described above.

The storage portion 7 is a nonvolatile storage device. For example, the storage portion 7 may be a flash memory, an SSD (Solid State Drive), or an HDD (Hard Disk Drive). The storage portion 7 stores image data that is read by the image reading portion 2. It is noted that the storage portion 7 may be the EEPROM of the control portion 5.

Meanwhile, in the image processing apparatus 10, an operation restricting area in which touch operations on the display portion 62 are restricted, is set in the display portion 62 by a setting processing portion 53 of the control portion 5, described below.

Here, in a conventional image processing apparatus, the user may operate an operation icon within the operation restricting area without noticing that the operation restricting area has been set in the display portion 62. To solve this issue, the image processing apparatus 10 according to the embodiment of the present disclosure prevents a meaningless operation from being made in the operation restricting area as explained below.

Specifically, a notification program configured to make the CPU of the control portion 5 execute a notifying process (see flowchart in FIG. 7) described below, is preliminarily stored in the ROM of the control portion 5. It is noted that the notification program is stored in a computer-readable recording medium such as a CD, a DVD, and a flash memory, and may be installed from the recording medium into a storage device such as the storage portion 7.

As shown in FIG. 2, the control portion 5 includes a display processing portion 51, a first process executing portion 52, the setting processing portion 53, a notification processing portion 54, and a second process executing portion 55. Specifically, the CPU of the control portion 5 executes the notification program stored in the ROM. This allows for the control portion 5 to function as the display processing portion 51, the first process executing portion 52, the setting processing portion 53, the notification processing portion 54, and the second process executing portion 55. Here, the structure including the control portion 5 and the operation/display portion 6 is an example of an operation input device in the present disclosure.

The display processing portion 51 is configured to display, on the display portion 62, one or more operation icons that are each made to correspond to a process.

For example, when a predetermined display condition is satisfied, the display processing portion 51 displays, on the display portion 62, a screen including one or more operation icons and corresponding to the predetermined display condition. In the image processing apparatus 10, multiple pieces of screen data are preliminarily stored in the ROM of the control portion 5 respectively in correspondence to a plurality of the display conditions. When one of the display conditions is satisfied, the display processing portion 51 displays a screen based on one of the multiple pieces of screen data corresponding to the satisfied display condition.

Figure 4:
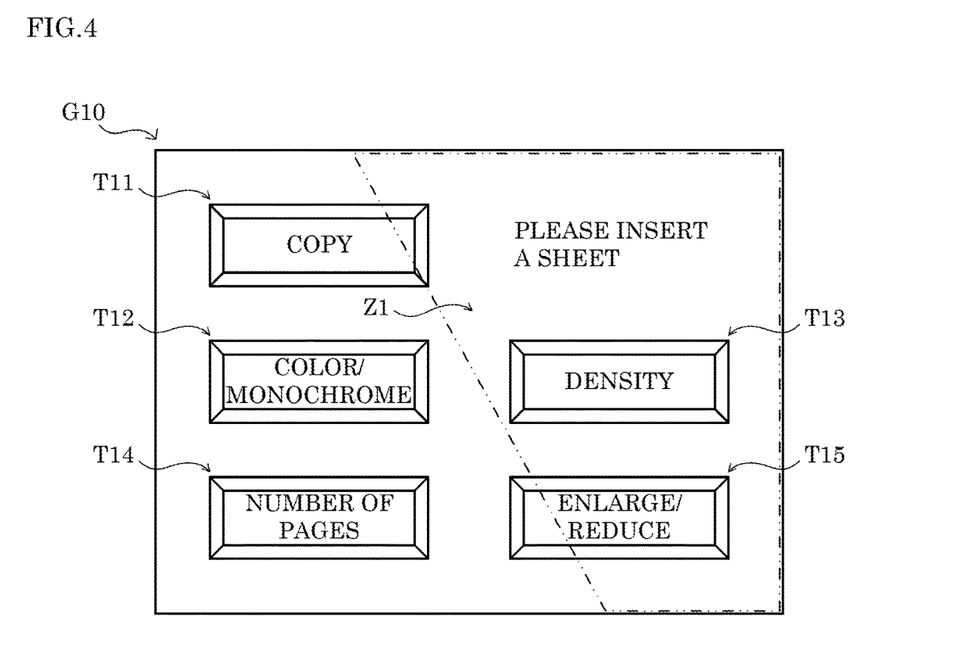
FIG. 4 is a diagram showing an example of a screen displayed on the operation/display portion of the image processing apparatus according to the embodiment of the present disclosure.

Here, FIG. 4 shows a screen G10 that is an example of the screen displayed on the display portion 62 by the display processing portion 51. As shown in FIG. 4, the screen G10 includes a plurality of operation icons T11 to T15. It is noted that the screen G10 is displayed when a copy job is chosen on a job selection screen displayed on the display portion 62 when, for example, the image processing apparatus 10 is turned on.

Figure 5:
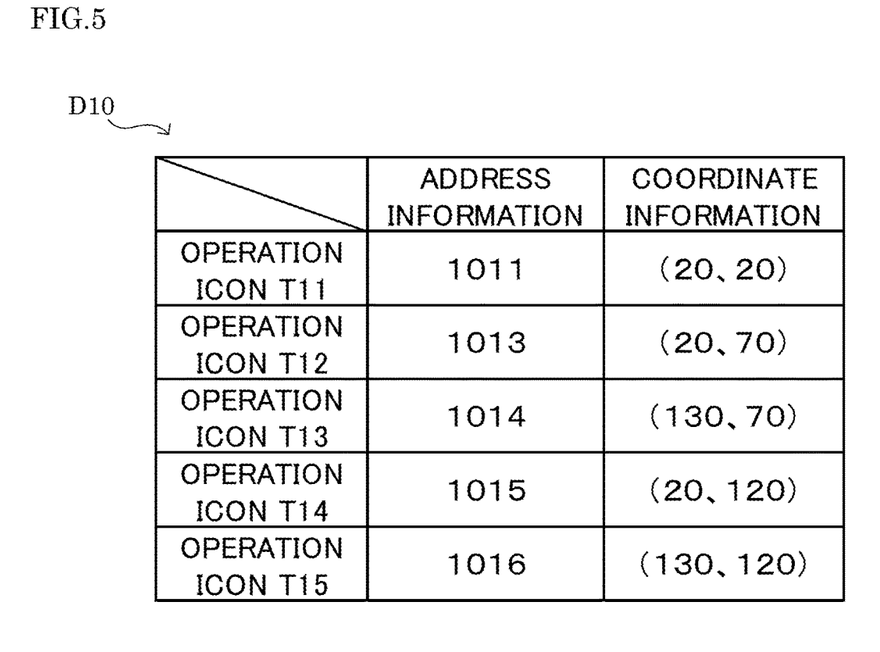
FIG. 5 is a diagram showing an example of screen data used to display a screen in the image processing apparatus according to the embodiment of the present disclosure.

In addition, FIG. 5 shows screen data D10 that is an example of the screen data used by the display processing portion 51 to display the screen G10. As shown in FIG. 5, the screen data D10 includes address information and coordinate information for the operation icons T11 to T15. The address information indicates addresses of image data of the operation icons T11 to T15 that are preliminarily stored in the ROM of the control portion 5. The coordinate information indicates display positions of the operation icons T11 to T15 in the display portion 62.

For example, when displaying the screen G10 on the display portion 62, the display processing portion 51 first reads the screen data D10 from the ROM of the control portion 5. Next, the display processing portion 51 acquires the image data of the operation icons T11 to T15 based on the address information included in the screen data D10. Then, the display processing portion 51 displays the acquired image data at positions specified by the coordinate information included in the screen data D10 on the display portion 62.

In response to a touch operation on one of the operation icons, the first process executing portion 52 executes a process corresponding to the one operation icon on which the touch operation was performed.

Specifically, when the touch operation has been detected on the display portion 62 by the operation detecting portion 63, the first process executing portion 52 determines whether or not an operation icon is displayed at a position where the touch operation was detected, based on the coordinate information included in the screen data. When it is determined that an operation icon is displayed at the position where the touch operation was detected, the first process executing portion 52 executes the process corresponding to the operation icon whose operation was detected.

For example, when a touch operation is detected on the operation icon T11 of the screen G10 shown in FIG. 4, the first process executing portion 52 executes the copy job. In addition, when a touch operation is detected on the operation icon T13 of the screen G10, the first process executing portion 52 displays a density setting screen used for setting a print density on the display portion 62.

The setting processing portion 53 is configured to set the operation restricting area in which the touch operation on the display portion 62 is restricted, in the display portion 62.

Here, in the operation restricting area, detection of the touch operation in the area, or execution of a process in response to a detection of the touch operation in the area is restricted. For example, in the image processing apparatus 10, the execution of the process in response to the detection of the touch operation in the operation restricting area is prohibited.

It is noted that in the image processing apparatus 10, the operation restricting area may be an area in which the detection of the touch operation is made invalid. In addition, the operation restricting area may be an area in which detection sensitivity of the touch operation is lower than other areas. In addition, the operation restricting area may be an area in which execution of a part of the process in response to the detection of the touch operation is prohibited.

For example, the setting processing portion 53 sets the shielded area detected by the shield detecting portion 66 as the operation restricting area. For example, when the shielded area Z1 shown in FIG. 3 is detected by the shield detecting portion 66, the setting processing portion 53 sets the shielded area Z1 as the operation restricting area.

It is noted that the setting processing portion 53 may set a part of the shielded area detected by the shield detecting portion 66 as the operation restricting area. In addition, when the touch operation is detected at an edge portion of the display portion 62 by the operation detecting portion 63, the setting processing portion 53 may set a predetermined range including a position of the touch operation as the operation restricting area. In addition, the setting processing portion 53 may set a predetermined area in the display portion 62 as the operation restricting area.

When some of the operation icons are partially or completely overlapped with the operation restricting area set by the setting processing portion 53, the notification processing portion 54 notifies the overlapped operation icons by voice.

For example, the notification processing portion 54 may notify, by voice, one or more operation icons that each have a percentage of area overlapped with the operation restricting area that is greater than or equal to a predetermined threshold. For example, the threshold may be 30 percent. It is noted that the threshold may be an arbitrarily set value.

For example, when the operation restricting area is set by the setting processing portion 53, the notification processing portion 54 determines whether or not each of the operation icons are overlapped with the operation restricting area based on the coordinate information and image data of the operation icons. In addition, with respect to each of the operation icons determined to be overlapped with the operation restricting area, the notification processing portion 54 determines whether or not a percentage of area overlapped with the operation restricting area is greater than or equal to the predetermined threshold. Then, the notification processing portion 54 notifies, by voice, the operation icons that are each determined to have a percentage of area overlapped with the operation restricting area that is greater than or equal to the predetermined threshold. It is noted that when there is more than one operation icon to be notified by voice, the notification processing portion 54 notifies the operation icons sequentially.

For example, in the image processing apparatus 10, read-aloud data is preliminarily stored in the storage portion 7, wherein the read-aloud data includes a plurality of pieces of notification information which respectively correspond to the operation icons and each indicate a piece of voice notification content. When notifying an operation icon by voice, the notification processing portion 54 acquires a piece of the notification information corresponding to the operation icon from the read-aloud data. Then, after converting the acquired notification information to a voice signal, the notification processing portion 54 outputs the signal to the speaker 64.

For example, when the shielded area Z1 shown in FIG. 3 and FIG. 4 is set in the screen G10 shown in FIG. 4 as the operation restricting area, the notification processing portion 54 identifies the operation icon T11, the operation icon T13, and the operation icon T15 as the operation icons overlapped with the operation restricting area. In addition, the notification processing portion 54 determines that the operation icon T13 and the operation icon T15 are operation icons that each have a percentage of area overlapped with the operation restricting area that is greater than or equal to the predetermined threshold. Then, the notification processing portion 54 acquires the notification information corresponding to the operation icon T13 and the operation icon T15 from the read-aloud data, and performs voice notification based on the acquired notification information.

Figure 6:
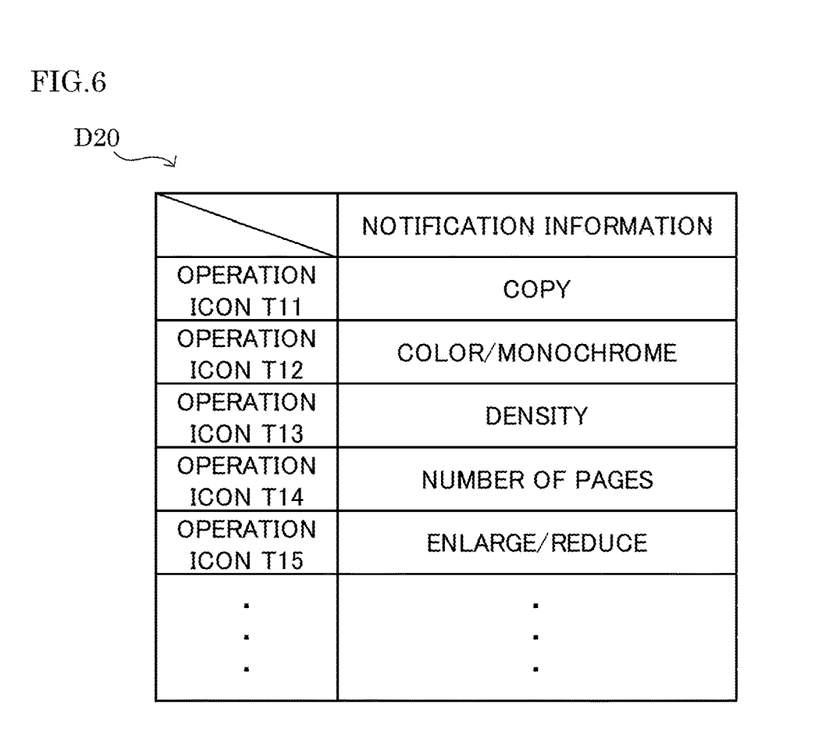
FIG. 6 is a diagram showing an example of read-aloud data used to read aloud an operation icon in the image processing apparatus according to the embodiment of the present disclosure.

FIG. 6 shows read-aloud data D20 that is an example of read-aloud data. For example, as shown in FIG. 6, the notification information may include text information indicating characters included in the image data of each of the operation icons (see FIG. 4).

It is noted that the notification processing portion 54 may notify, by voice, all of the operation icons overlapped with the operation restricting area.

The second process executing portion 55 is configured to execute a process corresponding to the operation icon identified by an identification operation that is performed in a different manner from the touch operation on the display portion 62 to identify the operation icon overlapped with the operation restricting area.

For example, when the operation restricting area is set by the setting processing portion 53, the second process executing portion 55 executes the process corresponding to the operation icon identified by the identification operation, in response to the identification operation. It is noted that the second process executing portion 55 may execute the process corresponding to the operation icon identified by the identification operation in response to the identification operation, even when the operation restricting area is not set by the setting processing portion 53.

For example, the identification operation may include an operation input by voice to the image processing apparatus 10. For example, the identification operation may be an operation of inputting, by voice, a predetermined word such as "OK" or "yes" during a predetermined waiting time starting from a time when the operation icon to be operated is finished being read aloud by the notification processing portion 54.

It is noted that the identification operation may be an operation of inputting, by voice, a portion or all of the text information corresponding to the operation icon to be operated.

In addition, the identification operation may be an operation on a predetermined operation key. For example, the identification operation may be an operation on a predetermined operation key of the operation key portion 61 performed during the predetermined waiting time starting from the time when the operation icon to be operated is finished being read aloud by the notification processing portion 54. In addition, the identification operation may be an operation on a ten-key of a number indicating an order in which the operation icon to be operated is to be read aloud by the notification processing portion 54. In addition, the identification operation may include both the input operation by voice to the image processing apparatus 10, and the operation on the predetermined operation key.

Here, the notification processing portion 54 notifies the operation icon as well as a method of the identification operation by voice. It is noted that the notification processing portion 54 may not notify the method of the identification operation by voice.

It is further noted that the control portion 5 may not include the first process executing portion 52 and the second process executing portion 55.

[Notifying Process]

Figure 7:
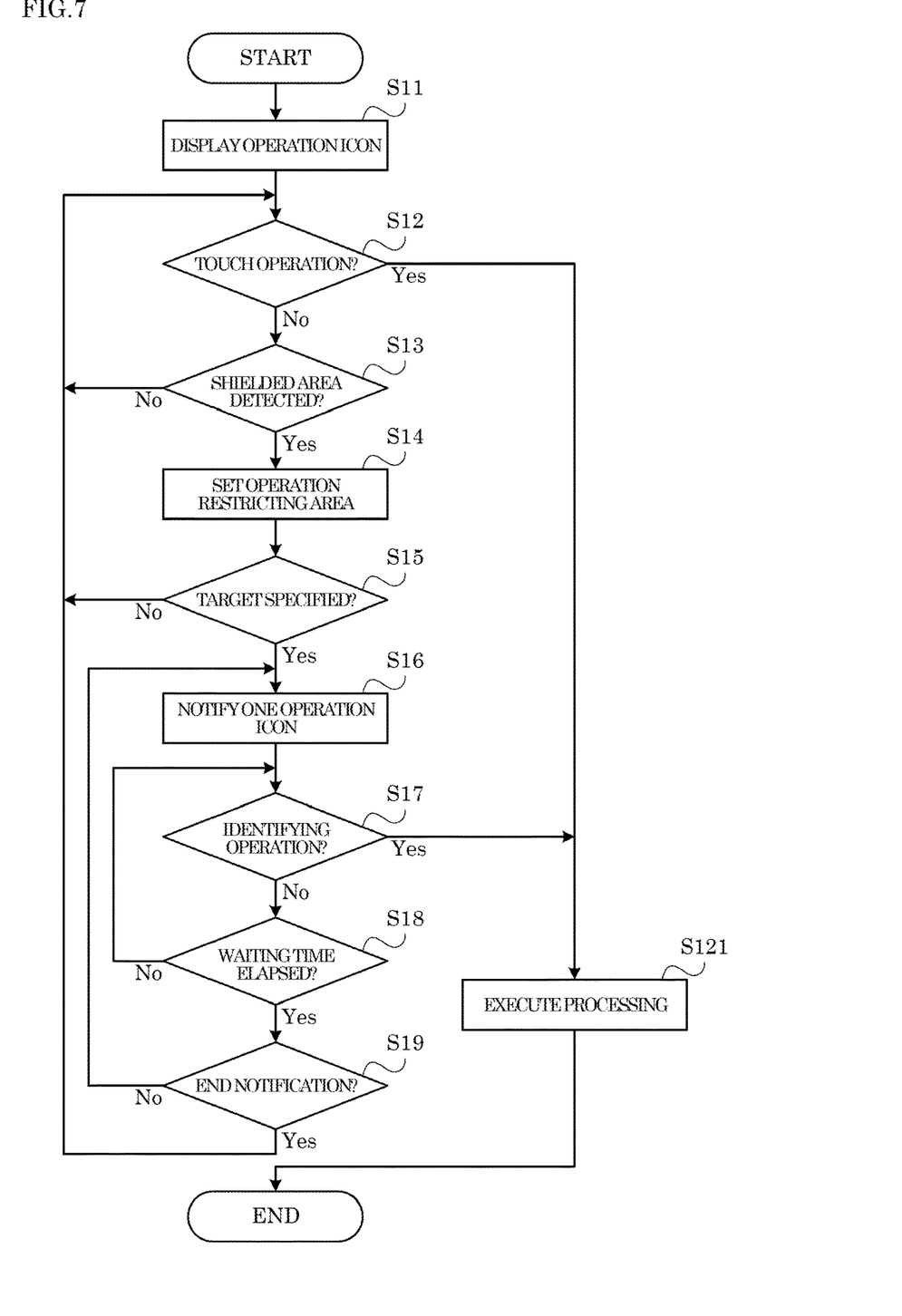
FIG. 7 is a flowchart showing an example of a notifying process executed in the image processing apparatus according to the embodiment of the present disclosure.

Below, with reference to FIG. 7, a description is given of an example procedure of a notifying process executed by the control portion 5 in the image processing apparatus 10. Here, steps S11, S12 . . . indicate the numbers of processing procedures (steps) executed by the control portion 5. It is noted that the notifying process executed when the control portion 5 determines that the display condition has been satisfied.

<Step S11>

First, in step S11, the control portion 5 displays the operation icon on the display portion 62. Here, processing in step S11 is executed by the display processing portion 51 of the control portion 5.

Specifically, the control portion 5 displays the screen on the display portion 62 based on the screen data corresponding to the display condition that was determined to be satisfied immediately before execution of the notifying process.

<Step S12>

In step S12, the control portion 5, using the operation detecting portion 63, determines whether or not the touch operation has been performed on the operation icon included in the screen displayed in step S11.

Specifically, when the touch operation on the display portion 62 has been detected by the operation detecting portion 63, the control portion 5 determines whether or not the operation icon is displayed at a position where the touch operation was detected, based on the coordinate information included in the screen data. When the control portion 5 determines that the operation icon is displayed at the position where the touch operation was detected, the control portion 5 determines that the touch operation has been performed on the operation icon.

Here, when the control portion 5 determines that the touch operation has been performed on the operation icon (Yes in S12), the control portion 5 moves the process to step S121. In addition, when the control portion 5 determines that the touch operation has not been performed on the operation icon (No in S12), the control portion 5 moves the process to step S13.

<Step S121>

In step S121, the control portion 5 executes the process corresponding to the operation icon on which the touch operation was determined to have been performed in step S12. Then, the control portion 5 ends the notifying process. Here, processing in steps S12 and S121 are executed by the first process executing portion 52 of the control portion 5. It is noted that when a new screen including the operation icon is displayed on the display portion 62 in accordance with the execution of the process corresponding to the operation icon, the control portion 5 determines that the display condition has been satisfied, and executes the notifying process corresponding to the new screen. On the other hand, when a new screen not including the operation icon is displayed on the display portion 62 in accordance with the execution of the process corresponding to the operation icon, since the display condition is not satisfied, the notifying process is not executed.

<Step S13>

In step S13, the control portion 5 determines whether or not the shielded area has been detected by the shield detecting portion 66.

Here, when the control portion 5 determines that the shielded area has been detected by the shield detecting portion 66 (Yes in S13), the control portion 5 moves the process to step S14. In addition, when the control portion 5 determines that the shielded area has not been detected by the shield detecting portion 66 (No in S13), the control portion 5 moves the process to step S12, and waits for the detection of the touch operation on the operation icon and the detection of the shielded area.

<Step S14>

In step S14, the control portion 5 sets the operation restricting area in the display portion 62. Here, processing in step S14 is executed by the setting processing portion 53 of the control portion 5.

For example, the control portion 5 sets the shielded area detected in step S13 as the operation restricting area. With this configuration, in a case where the shielding object is the user's hand, the operation restricting area can be set in response to a position of the user's hand.

<Step S15>

In step S15, the control portion 5 determines whether or not the operation icon to be notified has been specified.

For example, the control portion 5 executes an object specifying process for specifying the operation icon to be notified.

For example, in the object specifying process, it is determined whether or not the operation restricting area set in step S14 is overlapped with each of the operation icons, based on the coordinate information and image data of the operation icons. In addition, in the object specifying process, it is determined with respect to one or more operation icons determined to be overlapped with the operation restricting area, whether or not a percentage of area overlapped with the operation restricting area is greater than or equal to the predetermined threshold. Then, in the object specifying process, one or more operation icons that have been determined to each have a percentage of area overlapped with the operation restricting area that is greater than or equal to the predetermined threshold are specified as the operation icons to be notified.

Here, in the notifying process, only the one or more operation icons determined to each have a percentage of area overlapped with the operation restricting area that is greater than or equal to the predetermined threshold are notified by voice. With this configuration, it is possible to avoid performing voice notification even of an operation icon with a small area overlapped with the operation restricting area.

Here, when the control portion 5 determines that the operation icon to be notified has been specified (Yes in S15), the control portion 5 moves the process to step S16. In addition, when the control portion 5 determines that the operation icon be notified has not been specified (No in S15), the control portion 5 moves the process to step S12.

<Step S16>

In step S16, the control portion 5 notifies one of the operation icons specified in step S15. Here, processing in steps S15 and S16 are executed by the notification processing portion 54 of the control portion 5.

For example, the control portion 5 may acquire the notification information corresponding to the operation icon to be notified included in the read-aloud data. Then, the control portion 5 converts the acquired notification information to the voice signal, and outputs the voice signal to the speaker 64.

It is noted that the control portion 5 may notify the method of the identification operation before the first operation icon is notified. This allows for a user to recognize the method of the identification operation.

<Step S17>

In step S17, the control portion 5 determines whether or not the identification operation has been performed.

For example, when a voice input of the predetermined word such as "OK" or "yes" is detected by the microphone 65, the control portion 5 determines that the identification operation has been performed.

Here, when the control portion 5 determines that the identification operation has been performed (Yes in S17), the control portion 5 moves the process to step S121. In this case, a process corresponding to the operation icon notified immediately before the identification operation is executed in step S121. Here, processing in steps S17 and S121 following the execution of processing in step S16 is executed by the second process executing portion 55 of the control portion 5. In addition, when the identification operation is not performed (No in S17), the control portion 5 moves the process to step S18.

<Step S18>

In step S18, the control portion 5 determines whether or not the waiting time has elapsed.

Here, when the control portion 5 determines that the waiting time has elapsed (Yes in S18), the control portion 5 moves the process to step S19. In addition, when the waiting time has not elapsed yet (No in step S18), the control portion 5 moves the process to step S17, and waits for the identification operation and for the waiting time to elapse.

<Step S19>

In step S19, the control portion 5 determines whether or not processing in step S16 has been executed for all of the operation icons specified in step S15.

Here, when the control portion 5 determines that the processing in step S16 has been executed for all of the operation icons (Yes in step S19), the control portion 5 moves the process to step S12. In addition, when the processing in step S16 has not been executed for all of the operation icons (No in step S19), the control portion 5 moves the process to step S16. In this case, in step S16, notification of the one or more operation icons that have not been notified yet is performed.

As described above, in the image processing apparatus 10, when the operation restricting area is set by the setting processing portion 53, the operation icon(s) partially or completely overlapped with the operation restricting area is notified by voice. With this configuration, a meaningless operation in the operation restricting area can be prevented.

In addition, in the image processing apparatus 10, a process corresponding to the operation icon identified by the identification operation is executed, in response to the identification operation performed in a manner different from the touch operation. This allows for the user to perform an operation on the operation icon overlapped with the operation restricting area without disabling the setting of the operation restricting area.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation input device, comprising:
    a display;
    a shield detecting portion including a plurality of sensors configured to detect a shielded area in the display that is covered by a shielding object; and
    a processor configured to:
        display a plurality of operation icons made to correspond to a predetermined process on the display;
        set an operation restricting area in which a touch operation on the display portion is restricted; and
        notify, by voice, one or more of the plurality of operation icons partially or completely overlapped with the operation restricting area, wherein
    the processor sets the shielded area detected by the shield detecting portion as the operation restricting area, and
    when the operation restricting area is set, the processor notifies, by voice, the one or more of the plurality of operation icons partially or completely overlapped with the operation restricting area, and when there are two or more operation icons to be notified by voice, the processor notifies the two or more operation icons sequentially.

2. The operation input device according to claim 1, wherein the processor is further configured to:
    execute a process in response to a touch operation on a first operation icon of the plurality of operation icons, the process corresponding to the first operation icon on which the touch operation is performed, and
    execute a process in response to an identification operation different from the touch operation on the display that identifies a second operation icon of the plurality of operation icons when the second operation icon is overlapped with the operation restricting area, the process corresponding to the second operation icon identified by the identification operation.

3. The operation input device according to claim 2, wherein
    the identification operation includes an operation input by voice to the operation input device.

4. The operation input device according to claim 2, wherein
    the identification operation includes an operation on a predetermined operation key.

5. The operation input device according to claim 2, wherein
    the processor notifies a method of the identification operation by voice.

6. The operation input device according to claim 1, wherein
    the processor notifies, by voice, an operation icon of the plurality of operation icons whose percentage of its area overlapped with the operation restricting area is greater than or equal to a predetermined threshold.

7. An image processing apparatus, comprising:
    the operation input device according to claim 1; and
    either or both of an image reading portion configured to read image data of a document sheet, and an image forming portion configured to form an image based on image data.

8. A notifying method, comprising:
    displaying a plurality of operation icons corresponding to a predetermined process on a display;
    detecting a shielded area in the display that is covered by a shielding object;
    setting an operation restricting area in which a touch operation on the display is restricted; and notifying, by voice, one or more of the plurality of operation icons partially or completely overlapped with the operation restricting area that is set, wherein the shielded area is set as the operation restricting area, and when the operation restricting area is set, the one or more of the plurality of operation icons partially or completely overlapped with the operation restricting area are notified by voice, and when there are two or more operation icons to be notified by voice, the two or more operation icons are notified sequentially.

9. A process executing method executed in an operation input device including a display, comprising:

displaying a plurality of operation icons corresponding to a predetermined process on the display;

detecting a shielded area in the display that is covered by a shielding object;

setting an operation restricting area in which a touch operation on the display is restricted;

notifying, by voice, one or more of the plurality of operation icons partially or completely overlapped with the operation restricting area that is set;

executing a process in response to a touch operation on the one or more of the plurality of operation icons, the process corresponding to the one or more of the plurality of operation icons on which the touch operation is performed; and executing a process in response to an identification operation, different from the touch operation on the display, that identifies the one or more of the plurality of operation icons overlapped with the operation restricting area, the process corresponding to the one or more of the plurality of operation icons identified by the identification operation, wherein the shielded area is set as the operation restricting area, and when the operation restricting area is set, the one or more of the plurality of operation icons partially or completely overlapped with the operation restricting area are notified by voice, and when there are two or more operation icons to be notified by voice, the two or more operation icons are notified sequentially.

10. The process executing method according to claim 9, wherein the identification operation includes either or both of an operation input by voice to the operation input device and an operation on a predetermined operation key.

* * * * *